April 4, 1939.  D. M. MYERS  2,152,768
MEASURING MEANS
Filed June 1, 1938
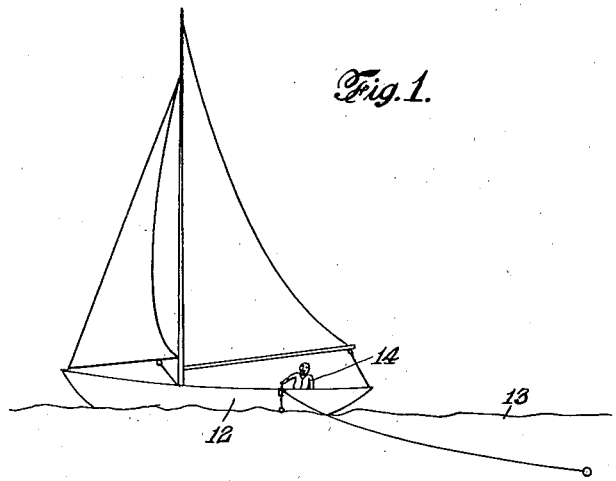
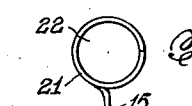 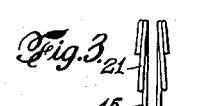
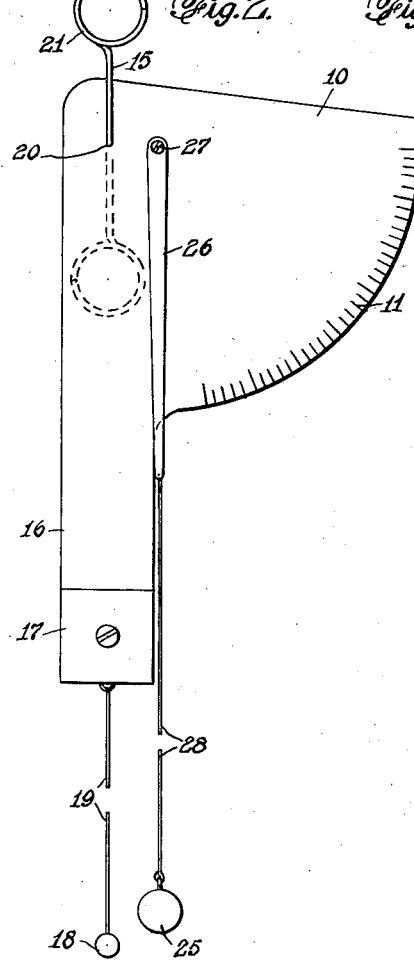 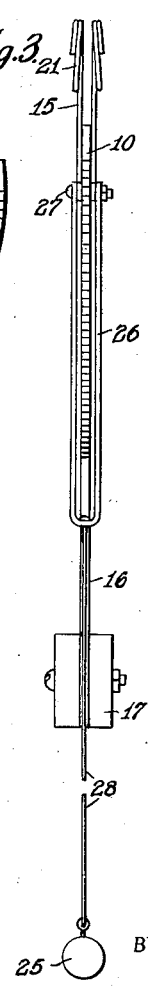 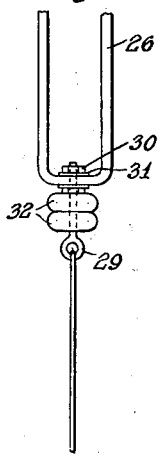
INVENTOR.
DAVID MOFFAT MYERS
BY
ATTORNEY.

Patented Apr. 4, 1939

2,152,768

UNITED STATES PATENT OFFICE 2,152,768

MEASURING MEANS

David Moffat Myers, Larchmont, N. Y.

Application June 1, 1938, Serial No. 211,117

12 Claims. (Cl. 73—122)

The invention relates to measuring apparatus, more especially to a device for measuring velocity as between an object and a fluid.

The invention has for an object to provide a simple, inexpensive and relatively accurate measuring device for indicating, for example, the speed of a boat through water or of the flow of water with reference to a stationary object by which the device is carried.

It has for a further object to provide an indicating device whereby there may be obtained reasonably accurate measures of speed, for example, of small sailing boats operating at relatively low speeds.

A still further object of the invention is to provide a device of this nature suitable for measuring the velocity of a flowing fluid stream relatively to a stationary object.

In carrying out the invention, the novel measuring device is designed to be suspended from an object which may be moving or stationary, said device comprising a graduated plate which is weighted at the bottom and has a handle member pivotally attached at the upper portion of the plate for suspending said plate under the action of gravity in a definite zero position. There is associated with the said plate, as by pivotally attaching thereto, for example, at a point displaced laterally from the point of suspension of the handle member, an angularly movable element designed to swing over the face of the plate and over a graduated scale thereon. This member is connected, preferably by means of a flexible cord or the like, to a drag member designed to be dropped overboard or into the moving stream while the plate is held over the object by the suspending handle so that the drag or velocity effect may be communicated to and registered upon the measuring device.

Or, the cord itself may be caused to operate similarly over the said scale, the arm assuming a position deviating from the vertical or zero location at an angle which is a function of the speed.

The nature of the invention, however, will best be understood when described in connection with the accompanying drawing, in which:

Fig. 1 is a perspective view of a sail boat illustrating the use of the novel device in connection therewith for measuring its speed.

Fig. 2 is a front elevation of the novel indicating device.

Fig. 3 is a side elevation; and Fig. 4, a plan thereof.

Fig. 5 is a detail view illustrating the means for changing the calibration of the device.

Referring to the drawing, the novel measuring device is indicated as comprising the plate 10, preferably of transparent material such as Celluloid or like substance, and is in the form preferably of a quadrant having provided along its circumference graduations affording a scale 11 corresponding, for example, to velocities of a boat 12 sailing in water 13. In this use of the device, the same is designed to be suspended therefrom as by an occupant 14 of the boat holding the same over the side. Due to the transparency of the quadrant 10, the device may be suspended over either the port or starboard side of the boat as the graduations 11 may readily be seen through the material constituting the quadrant.

Plate 10 is designed to be suspended by a handle member 15 pivoted to its upper portion, the plate at its lower portion being weighted to secure under the action of gravity thereon a definite zero position when the plate is thus suspended. For example, the quadrant may be provided with a radial extension or arm 16 to the outer end of which is secured a weight 17.

Provision may be made, also, in connection with this arm for a gauge element embodying a smaller weight 18 and a flexible connection as the cord 19 between said weight and arm and of predetermined length. When thus suspending the measuring device over the side of a boat or into a flowing stream, the same may be set thereby substantially at a predetermined height above the water level.

Handle member 15 is constructed conveniently of a stiff wire or the like bent into U-shaped form with its transverse portion passing through a hole 20 in the plate and the upper ends of the legs of the member extending beyond the upper edge of said plate and terminating in convolutions 21 which afford respective digital openings 22 for manually supporting the measuring device. Moreover, this construction of the handle member permits of the same being swung angularly over the side edge of the plate for location over the plate surfaces when the device is not in use.

For securing a measurement of the relative velocity, for example between the boat 12 and the water 13, use is made of the velocity effect upon a drag member 25 which may be in the nature of a ball or weight and connected with the plate through means having an angular movement thereover and cooperating with the scale 11 thereon, the degree of angular movement being a measure of the speed of the boat. Thus, a bifurcated arm 26 is shown as arranged to embrace the graduated edge of the plate and its free ends are pivotally attached to the plate as at a point 27 which is laterally displaced from the point of suspension of the plate and in the direction of movement of the drag. To the outer end of the said arm is attached a flexible element or cord 28 connecting the arm to the drag 25. By this arrangement, the bifurcated arm provides, also, a leverage effect as communicated by the drag in the fluid and which automatically aligns the graduated plate parallel to the course of the boat.

The aforesaid connection between the cord and arm may conveniently be effected by means of an eye bolt 29, nuts 30, and washers 31 to swivel the drag member to the arm. Furthermore, one or more weights 32 may be mounted over the eye bolt for calibration purposes, thus making the device suitable for use with measurements involving substantially different velocity ranges.

In operation, it is necessary merely to set the drag 25 in the fluid, plate 10 being suspended by its handle member 15 as hereinbefore set forth and finding its normal zero position under the action of weight 17, while its proper height above the fluid in the case of a flowing liquid may be determined by the gauge element, for example, by locating weight 18 approximately in contact with the surface of the liquid. The velocity effect on the drag member 25 will then displace its connecting cord 28 as well as arm 26 angularly over the plate, the degree of displacement being a measure of the relative velocity between the object on which the plate is carried and the fluid in which the drag is immersed, and may be read directly from the scale 11 provided on the plate.

It is well known that the resistance or "pull" of an immersed object drawn through a fluid is proportional to the square of its velocity, and instruments designed to record such resistance of "pull" as a measure of speed therefore obtain disproportionately small unit readings at the lower speeds and disproportionately high unit readings at the higher rates of speed. This natural defect of such means of measuring speed is overcome in the present device since, owing to the pendulum-like action of the drag and flexible connection, only an extremely small velocity and corresponding force or "pull" is required at the very low speeds, thus compensating for the velocity square effect with the consequent improvement in the uniformity of unit readings from zero to full speed.

Hence, with this instrument it is possible to measure even a slow tide when the boat lies at anchor. The range of measurement, however, may be varied, as hereinbefore set forth, by weighting the arm as provided for and by altering the weight of the drag itself. By variously locating the point of suspension 20 of the handle member 15 with respect to the point of attachment of arm 26 to plate 10, the characteristic of the scale 11 may be adjusted or modified to suit different speed ranges.

It will be appreciated, furthermore, that no previous setting or adjustment of the device is required, both the plate and the drag element automatically registering a zero position, due to the effect of gravity thereon and independently of springs, when no relative motion exists.

While the invention has been shown and described as applied specifically to the measurement of velocities of a sail boat or other vessels, it is to be understood that it may be utilized equally well for the measurement of the flow of water or other liquid or gas relatively to an object on which the device is carried. Also, instead of being manually supported by a person on the boat, it may, of course, be mounted on a rail or taffrail or other portion in a permanent manner for continuous measurement, the method indicated being merely for conveniently affording a quick, temporary indication.

I claim:

1. Means for measuring the relative velocity between an object and a fluid, comprising an indicator device adapted to be suspended from the object and including a graduated plate weighted at the bottom, a handle pivoted to the upper portion of the plate for suspending the latter under the action of gravity in a predetermined zero position, a drag member heavier than and adapted to ride in the fluid medium, and an angularly movable element connecting the drag member to the plate, said movable element cooperating with the graduations of the plate to afford a measure of the displacement of the drag member from a predetermined zero position, as a result of the velocity effect thereon.

2. Means for measuring the relative velocity between an object and a fluid, comprising an indicator device adapted to be suspended from the object and including a graduated plate of transparent material weighted at the bottom, a handle pivoted to the upper portion of the plate for suspending the latter under the action of gravity in a predetermined zero position, a drag member heavier than and adapted to ride in the fluid medium, and an angularly movable element connecting the drag member to the plate, said movable element cooperating with the graduations of the plate to afford a measure of the displacement of the drag member from a predetermined zero position, as a result of the velocity effect thereon.

3. Means for measuring the relative velocity between an object and a fluid, comprising an indicator device adapted to be suspended from the object and including a graduated plate weighted at the bottom, a handle pivoted to the upper portion of the plate for suspending the latter under the action of gravity in a predetermined zero position, a drag member heavier than and adapted to ride in the fluid medium, and an angularly movable element connecting the drag member to the plate and attached thereto at a point displaced laterally in the direction of movement from the point of suspension of said plate, said movable element cooperating with the graduations of the plate to afford a measure of the displacement of the drag member from a predetermined zero position, as a result of the velocity effect thereon.

4. Means for measuring the relative velocity between an object and a fluid, comprising an indicator device adapted to be suspended from the object and including a graduated plate weighted at the bottom, a handle pivoted to the upper portion of the plate for suspending the latter under the action of gravity in a predetermined zero position, a replaceable drag member heavier than and adapted to ride in the fluid medium, and an angularly movable element connecting the drag member to the plate, said movable element cooperating with the graduations of the plate to afford a measure of the displacement of the drag member from a predetermined zero position, as a result of the velocity effect thereon.

5. Means for measuring the relative velocity between an object and a fluid, comprising an indicator device adapted to be suspended from the object and including a graduated plate weighted at the bottom, a handle pivoted to the upper portion of the plate for suspending the latter under the action of gravity in a predetermined zero position, a drag member heavier than and adapted to ride in the fluid medium, a gravity-positioned element attached to and swingable over the plate, and a movable element connecting the drag member to the swingable element, said swingable element cooperating with the graduations of the plate to afford a measure of the displacement of the drag member from a predetermined zero position, as a result of the velocity effect thereon.

6. Means for measuring the relative velocity between an object and a fluid, comprising an indicator device adapted to be suspended from the object and including a graduated plate weighted at the bottom, a handle pivoted to the upper portion of the plate for suspending the latter under the action of gravity in a predetermined zero position, a drag member heavier than and adapted to ride in the fluid medium, a bifurcated arm embracing an edge of the plate, its free ends being pivotally attached thereto, and a flexible element connecting the outer end of the arm to the drag member, the arm being adapted to cooperate with the graduations of the plate to afford a measure of the displacement of the drag member from a predetermined zero position, as a result of the velocity effect thereon.

7. Means for measuring the relative velocity between an object and a fluid, comprising an indicator device adapted to be suspended from the object and including a graduated plate weighted at the bottom, a U-shaped handle member, its transverse portion passing through the plate at its upper portion for said plate to swing thereon and the legs of the member extending beyond the upper edge of the plate and terminating in respective digital openings, said handle member being swingable angularly over the side edge of the plate to locate the member over said plate when the measuring means is not in use and when in use suspending the plate under the action of gravity in a predetermined zero position, a drag member heavier than and adapted to ride in the fluid medium, and an angularly movable element connecting the drag member to the plate, said movable element cooperating with the graduations of the plate to afford a measure of the displacement of the drag member from a predetermined zero position, as a result of the velocity effect thereon.

8. Means for measuring the relative velocity between an object and a fluid, comprising an indicator device adapted to be suspended from the object and including a graduated plate weighted at the bottom, a handle pivoted to the upper portion of the plate for suspending the latter under the action of gravity in a predetermined zero position, a drag member heavier than and adapted to ride in the fluid medium, a bifurcated arm embracing an edge of the plate, its free ends being pivotally attached thereto, a member removably attached to the outer end of said bifurcated arm and replaceable weights carried thereby, and a flexible element connecting the removable member to the drag member, the arm being adapted to cooperate with graduations of the plate to afford a measure of the displacement of the drag member from a predetermined zero position, as a result of the velocity effect thereon.

9. Means for measuring the relative velocity between an object and a fluid, comprising an indicator device adapted to be suspended from the object and including a graduated plate weighted at the bottom, a handle pivoted to the upper portion of the plate for suspending the latter under the action of gravity in a predetermined zero position, a drag member heavier than and adapted to ride in the fluid medium, a bifurcated arm embracing an edge of the plate, its free ends being pivotally attached thereto, a member swivelled to and removably attached to the outer end of said bifurcated arm and replaceable weights carried thereby, and a flexible element connecting the swivelled member to the drag member, the arm being adapted to cooperate with graduations of the plate to afford a measure of the displacement of the drag member from a predetermined zero position, as a result of the velocity effect thereon.

10. Means for measuring the relative velocity between an object and a fluid, comprising an indicator device adapted to be suspended from the object and including a graduated quadrant having a radial extension weighted at its end, a handle member pivoted to the quadrant at its upper portion substantially in the line of action of gravity on said weighted end, a drag member heavier than and adapted to ride in the fluid medium, and an angularly movable element connecting the drag member to the plate and cooperating with the graduations thereof to afford a measure of the displacement of the drag member from a predetermined zero position, as a result of the velocity effect thereon.

11. Means for measuring the relative velocity between an object and a fluid, comprising an indicator device adapted to be suspended from the object and including a quadrant of transparent material provided with graduations along its circumference, said quadrant having a radial extension weighted at its end, a handle member pivoted to the quadrant at its upper portion substantially in the line of action of gravity on said weighted end, a drag member heavier than and adapted to ride in the fluid medium, and an angularly movable element connecting the drag member to the plate and cooperating with the graduations thereof to afford a measure of the displacement of the drag member from a predetermined zero position, as a result of the velocity effect thereon.

12. Means for measuring the relative velocity between an object and a fluid, comprising an indicator device adapted to be suspended from the object and including a graduated quadrant having a radial extension weighted at its end, a gauge element connected with said radial extension and embodying a flexible connection secured at its inner end to the extension and having a weight attached to its outer end, a handle member pivoted to the quadrant at its upper portion substantially in the line of action of gravity on said weighted end, a drag member heavier than and adapted to ride in the fluid medium, and an angularly movable element connecting the drag member to the plate and cooperating with the graduations thereof to afford a measure of the displacement of the drag member from a predetermined zero position, as a result of the velocity effect thereon.

DAVID MOFFAT MYERS.